No. 607,964. Patented July 26, 1898.
J. I. STAMPER.
GRAIN DRILL.
(Application filed May 24, 1898.)
(No Model.)
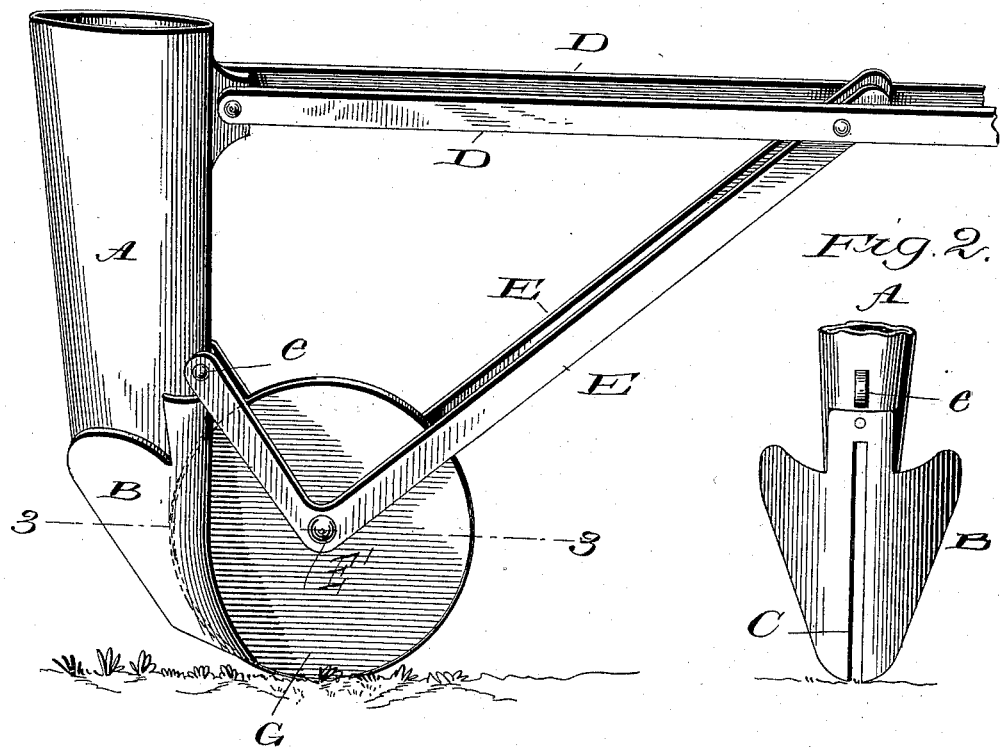
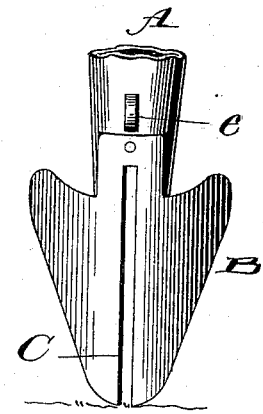
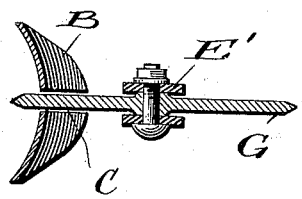
Witnesses
Inventor
James I. Stamper
by Franklin H. Hough
Attorney

UNITED STATES PATENT OFFICE.

JAMES I. STAMPER, OF MEADE, KANSAS.

GRAIN-DRILL.

SPECIFICATION forming part of Letters Patent No. 607,964, dated July 26, 1898.

Application filed May 24, 1898. Serial No. 681,565. (No model.)

*To all whom it may concern:*

Be it known that I, JAMES I. STAMPER, a citizen of the United States, residing at Meade, in the county of Meade and State of Kansas, have invented certain new and useful Improvements in Grain Drills and Shovels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in grain drills and shovels; and it is my purpose to provide an invention of this character whereby objections may be overcome which are met with in ordinary drills, whereby trash on the surface of foul land, which is frequently drilled without plowing, would be cut directly in front of each shovel and is likely to become clogged.

More specifically the present invention resides in the provision of a divided shovel which is secured to the lower end of a standard and has rotating in the slot dividing the shovel a colter, which is journaled on suitable arms supported from the drag-bars, the under end of the disk of the colter being slightly below the adjacent edges of the shovel.

To these ends and to such others as the invention may pertain the same consists, further, in the novel construction, combination, and adaptation of parts, as will be hereinafter more fully described, and then specifically defined in the appended claim.

My invention is clearly illustrated in the accompanying drawings, in which similar letters of reference indicate like parts, and in which—

Figure 1 is a side elevation showing the manner of attachment of my colter to the divided shovel. Fig. 2 is a front elevation of the shovel, and Fig. 3 is a sectional view on line 3 3 of Fig. 1.

Reference now being had to the details of the drawings by letter, A designates the standard, which may be secured in any convenient way to a drill, and fastened in the lower end of said standard is the shovel B, which shovel has a central aperture C, dividing the shovel into two sections or wings, as illustrated. Each wing is outwardly flared in the ordinary manner. Secured to the standard are the drag-bars D, between which are secured the upper ends of the arms E, which are bent at right angles at a point E' and the lower ends of said arms secured to the standard at the point e. At the angle E' the said arms are perforated, and journaled therein is the shaft carrying the colter G. This colter is so journaled with reference to the shovel that it will revolve through the aperture C, with the sides of the shovel coming adjacent to the faces of the colter, as illustrated in the drawings, while the lower end of the disk extends slightly below the lower points of the shovel. If desired, the arms E may have series of perforations, whereby the colter may be adjusted by raising or lowering the arms and securing the same to the drag-bars.

It is my purpose to construct my improved divided shovel in such a manner that it may be readily attached to drills in common use, and by this provision of having the colter revolve in the recesses of the shovel the trash which is not cut by the latter will pass underneath the shovel and will not become clogged.

Having thus described my invention, what I claim to be new, and desire to secure by Letters Patent, is—

In a grain-drill, the combination with the drill-tube, the divided shovel secured to its lower end, the drag-bars D pivoted to a lug on the drill-tube, the angle-arms E having their upper ends pivoted between said drag-bars, their lower ends pivoted to a lug adjacent to the upwardly-extended slotted portion of the shovel, and the colter pivoted to the angle portion of the arms, and working in the slot C of the shovel, as shown and for the purpose set forth.

In testimony whereof I affix my signature in presence of two witnesses.

JAMES I. STAMPER.

Witnesses:
F. C. JUDD,
JAY ELLIS.